(12) United States Patent
Narita et al.

(10) Patent No.: US 6,504,889 B1
(45) Date of Patent: Jan. 7, 2003

(54) METHOD OF OPERATING REACTOR

(75) Inventors: Kenmi Narita, Hitachi (JP); Katsumasa Haikawa, Jyuou-machi (JP); Akihiro Yamanaka, Hitachi (JP); Akiko Kanda, Hitachi (JP); Takaaki Mochida, Hitachi (JP); Junichi Yamashita, Hitachi (JP); Junichi Koyama, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/381,094

(22) PCT Filed: Mar. 17, 1997

(86) PCT No.: PCT/JP97/00840

§ 371 (c)(1), (2), (4) Date: Sep. 15, 1999

(87) PCT Pub. No.: WO98/41991

PCT Pub. Date: Sep. 24, 1998

(51) Int. Cl.[7] .................................................. G21C 19/02
(52) U.S. Cl. ........................ 376/267; 376/236; 376/237; 376/435
(58) Field of Search ................................ 376/236, 237, 376/435, 267

(56) References Cited

U.S. PATENT DOCUMENTS

| | | | | | |
|---|---|---|---|---|---|
| 4,285,769 A | * | 8/1981 | Specker et al. | ............. | 176/30 |
| 4,324,615 A | * | 4/1982 | Kobayashi et al. | ......... | 376/267 |
| 4,378,329 A | * | 3/1983 | Uchikawa et al. | .......... | 376/435 |
| 5,093,070 A | * | 3/1992 | Koyama et al. | ........... | 376/267 |
| 5,198,186 A | * | 3/1993 | Ogiya et al. | ................ | 376/435 |
| 5,544,211 A | * | 8/1996 | Haikawa et al. | ............ | 376/435 |
| 5,781,604 A | * | 7/1998 | Haikawa et al. | ............. | 379/419 |

FOREIGN PATENT DOCUMENTS

| | | | | |
|---|---|---|---|---|
| JP | 59-65290 | * | 4/1984 | ............ G21C/7/08 |
| JP | 61-26039 | * | 6/1986 | ............ G21C/7/08 |
| JP | 06-186372 | * | 7/1994 | ............ G21C/7/08 |
| JP | 61-186372 | * | 7/1994 | ............ G21C/7/08 |

* cited by examiner

Primary Examiner—Michael J. Carone
Assistant Examiner—John Richardson
(74) Attorney, Agent, or Firm—Antonelli, Terry, Stout & Kraus, LLP

(57) ABSTRACT

A method of operating a nuclear reactor reduces the number of reload fuels to be loaded into the nuclear reactor in the second and the following operation cycles.

The nuclear reactor has a reactor core in which a plurality of reload fuel assemblies respectively having different infinite multiplication factors are arranged. The method operates the nuclear reactor with control rods inserted in control cells each comprising four reload fuel assemblies having relatively large infinite multiplication factors among the plurality of reload fuel assemblies for a period longer than half of a period of an operation cycle.

16 Claims, 5 Drawing Sheets

|  | FIRST CONTROL CELL (A) | 12 |
|  | FIRST CONTROL CELL (B) | 12 |
|  | SECOND CONTROL CELL | 13 |
|  | FIRST CYCLE FUEL | 196 |
|  | SECOND CYCLE FUEL | 196 |
|  | THIRD CYCLE FUEL | 196 |
|  | FOURTH CYCLE FUEL | 196 |
|  | FIFTH CYCLE FUEL | 88 |

| | | |
|---|---|---|
|  | FIRST CONTROL CELL (A) | 12 |
|  | FIRST CONTROL CELL (B) | 12 |
|  | SECOND CONTROL CELL | 13 |
|  | FIRST CYCLE FUEL | 200 |
|  | SECOND CYCLE FUEL | 200 |
|  | THIRD CYCLE FUEL | 200 |
|  | FOURTH CYCLE FUEL | 200 |
|  | FIFTH CYCLE FUEL | 72 |

0~2.2 GWd/t 3.3~9.4 GWd/t 10.4 GWd/t

| | | |
|---|---|---|
|  | FIRST CONTROL CELL (A) | 16 |
|  | FIRST CONTROL CELL (B) | 24 |
|  | SECOND CONTROL CELL | 37 |
|  | FIRST CYCLE FUEL | 132 |
|  | LOW-ENRICHMENT FUEL | 76 |
|  | HIGH-ENRICHMENT FUEL | 664 |

0~2.2 GWd/t 3.3~9.4 GWd/t 10.4 GWd/t

METHOD OF OPERATING REACTOR

TECHNICAL FIELD

The present invention relates to a method of operating a boiling-water reactor which is and, more particularly, to a method of operating a boiling-water reactor suitable for the second and the following cycles.

BACKGROUND OF THE INVENTION

Generally, some initial loading fuel assemblies (hereinafter referred to as "initial loading fuels") are taken out of the reactor core of a nuclear reactor after the completion of an operation for the first cycle and are replaced with new reload fuel assemblies (hereinafter referred to as "reload fuels"). The fuel assemblies taken out of the nuclear reactor have burn-ups which are smaller than those of other fuel assemblies and so they generate a small amount of energy.

A method of operating a nuclear reactor, as disclosed in Japanese Patent Laid-open No. Hei 3-214097, loads at least fuel assemblies taken out of the reactor core of the nuclear reactor after the completion of the second cycle again into the reactor core when exchanging the fuel after the completion of the third cycle to increase the discharge exposure of the initial loading fuels and to reduce the number of reload fuels.

A technique, as disclosed in Japanese Patent Laid-open No. Hei 4-249794, controls the operation of a nuclear reactor by using only control rods adjacent to fuel assemblies not having a minimum enrichment factor and included in initial loading fuels loaded into the initial reactor core by arranging fuel assemblies having large enrichment factors in a peripheral part of the initial reactor core and by arranging fuel assemblies having small enrichment factors in a central part of the initial reactor core to increase the burn-up of the fuel assemblies removed from the reactor core after the completion of the first cycle.

A prior art technique, as disclosed in Japanese Patent Laid-open No. Hei 6-186372, constructs each of the control cells by using four fuel assemblies, including fuel assemblies having large infinite multiplication factors (hereinafter referred to as "large-infinite-multiplication fuels"), inserts control rods into the control cells in response to a decrease of the infinite multiplication factor of the large-infinite-multiplication-factor fuels below the mean infinite multiplication factor in the reactor core in one cycle, and operates the nuclear reactor in this state for the remaining period of the cycle.

It is mentioned in Japanese Patent Laid-Open No. Hei 6-186372 that many fuel assemblies having small infinite multiplication factors (hereinafter referred to as "small-infinite-multiplication-factor fuels") are arranged outside the control cell, and so a sufficiently large number of the small-infinite-multiplication-factor fuel assemblies can be arranged in the outer peripheral region of the reactor core, and hence the reactor core permits only slight neutron leakage. It is also mentioned in this cited reference that the construction of the control cells by assembling the fuel assemblies including small-infinite-multiplication factor fuels and the arrangement of a sufficiently large number of small-infinite-multiplication-factor fuels in the outer peripheral region of the reactor core, as compared with the construction of control cells by assembling only small-infinite-multiplication-factor fuels and the arrangement of an insufficient number of small-infinite-multiplication-factor fuels in the peripheral region of the reactor core, are effective in improving fuel economy.

The prior art technique mentioned in Japanese Patent Laid-open No. Hei 3-214097 loads the initial loading fuels again into the reactor core to increase the burn-up of the initial loading fuels and considers no measures for increasing the burn-up of reload fuels.

The prior art technique mentioned in Japanese Patent Laid-open No. Hei 4-249794 gives no consideration to the second and the following cycles.

The prior art technique mentioned in Japanese Patent Laid-open No. Hei 6-186372 gives no consideration to the reduction of the number of reload fuels.

SUMMARY OF THE INVENTION

It is an object of the present invention to provide a method of operating a nuclear reactor, which method is capable of reducing the number of reload fuels to be loaded into the nuclear reactor in the second and the following cycles.

With the foregoing object in view, according to the present invention, a method of operating a nuclear reactor having a reactor core, in which a plurality of reload fuel assemblies respectively having different infinite multiplication factors are arranged, inserts control rods in control cells each comprising four reload fuel assemblies having relatively large infinite multiplication factors among the plurality of reload fuel assemblies for a period longer than half of the period of an operation cycle.

According to the present invention, a method of operating a nuclear reactor having a reactor core, in which a plurality of reload fuel assemblies respectively having different infinite multiplication factors and initial loading fuel assemblies are arranged, inserts control rods in control cells each comprising four reload fuel assemblies having relatively large infinite multiplication factors among the plurality of reload fuel assemblies and the initial loading fuel assemblies in a period longer than half of the period of an operation cycle.

The burn-up of the fuel assemblies forming the control cells into which the control rods are inserted is suppressed by the control action of the control rods. Accordingly, when the nuclear reactor is operated with the control rods inserted into the control cells each comprising large-infinite-multiplication-factor fuels, the fuel assemblies of the control cells have large infinite multiplication factors in the next cycle. Since the fuel assemblies having large infinite multiplication factors can be used in the next cycle, the number of the reload fuels can be reduced by a number equal to the number of those fuel assemblies having large infinite multiplication factors.

BEST MODE FOR CARRYING OUT THE INVENTION

Preferred embodiments of the present invention will be described with reference to the accompanying drawings.

First, a state where only reload fuels are placed in the reactor core of a nuclear reactor will be explained.

Figure 1:
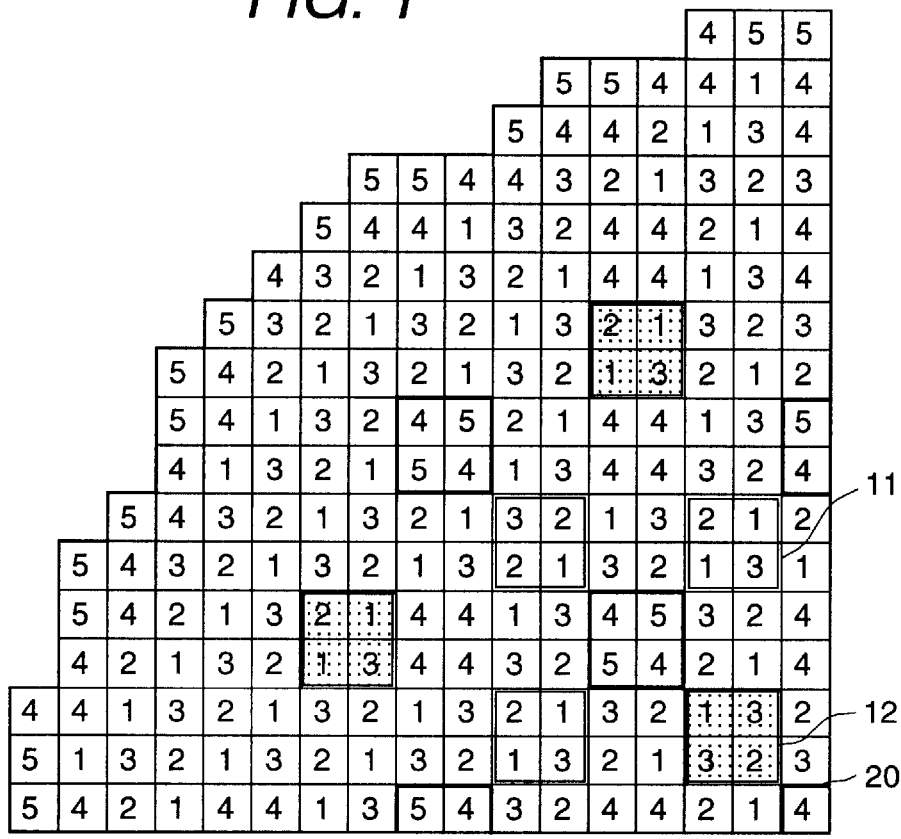
FIG. 1 is a quarter sectional view of a fuel loading pattern for an equilibrium cycle formed by a method representing a first embodiment according to the present invention.
Figure 1:
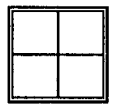
Figure 1:
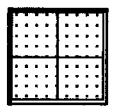
Figure 1:
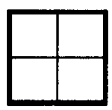
Figure 1:
Figure 1:
Figure 1:
Figure 1:
Figure 1:
Figure 2:
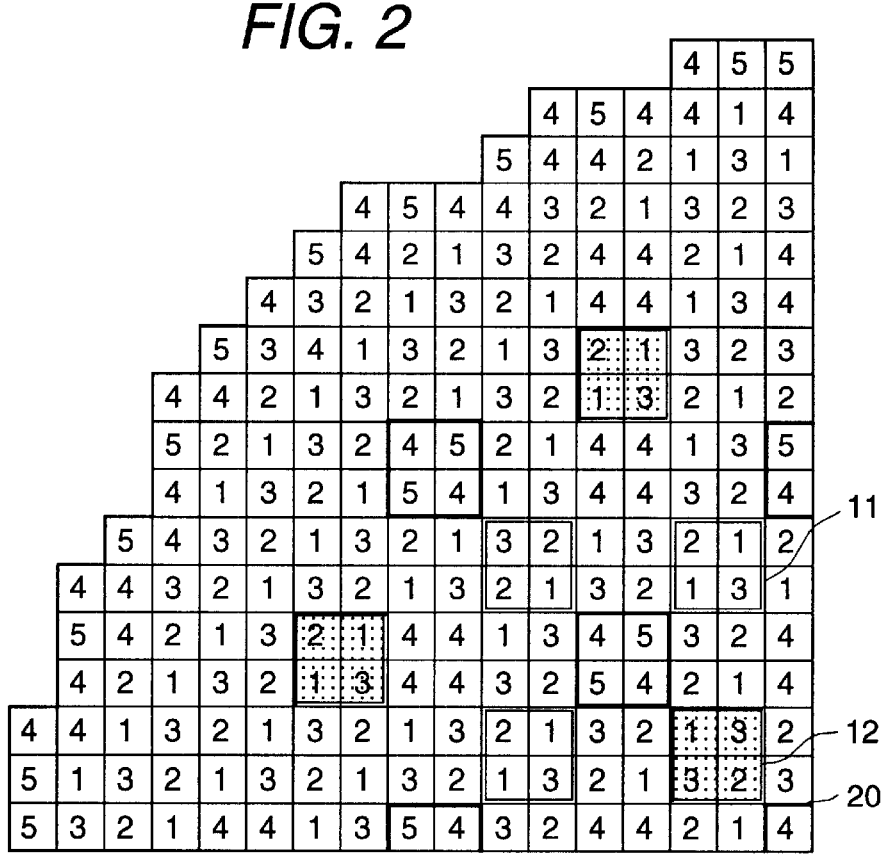
FIG. 2 is a quarter sectional view of a fuel loading pattern for an equilibrium cycle formed by a method representing a comparative example corresponding to the first embodiment.
Figure 2:
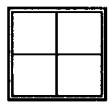
Figure 2:
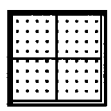
Figure 2:
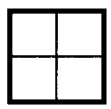
Figure 2:
Figure 2:
Figure 2:
Figure 2:
Figure 2:

FIG. 1 is a quarter sectional view of a fuel loading pattern for an equilibrium cycle formed by a method representing a first embodiment according to the present invention.

Referring to FIG. 1, an equilibrium core comprises 872 reload fuel assemblies including 196 fuel assemblies for the first cycle (hereinafter referred to as "first cycle fuels"), 196 fuel assemblies for the second cycle (hereinafter referred to as "second cycle fuels"), 196 fuel assemblies for the third cycle (hereinafter referred to as "third cycle fuels"), 196 fuel assemblies for the fourth cycle (hereinafter referred to as "fourth cycle fuels"n), and 88 fuel assemblies for the fifth cycle (hereinafter referred to a "fifth cycle fuels"). The mean enrichment factor of the reload fuel assemblies is about 3.8 wt %.

The reactor core is provided with twenty-four first control cells each consisting of four little fissioned fuel assemblies having a relatively large infinite multiplication factor, and thirteen second control cells 20 each consisting of four considerably fissioned fuel assemblies having a relatively small infinite multiplication factor.

The first control cell has first cycle fuels 1, second cycle fuels 2 and third cycle fuels 3. The second control cell 20 has fourth cycle fuels 4 and fifth cycle fuels 5.

The first control cells are divided into two groups differing from each other in the operation of the control rods; twelve first control cells 11 of a group A (hereinafter referred to a "first control cells (A)") and twelve first control cells 12 of a group B (hereinafter referred to as "first control cells (B)").

The first cycle fuels 1, the second cycle fuels 2 and the third cycle fuels 3 are disposed in regions other than an outer peripheral region of the reactor core and regions for the second control cells 20. The fifth cycle fuels 5 are disposed in the outer peripheral region and in the regions for the second control cells 20. The fourth cycle fuels 4 are disposed in the outer peripheral region of the reactor core, the regions for the second control cells 20, regions providing relatively high output and outer regions of the reactor core.

After an operation cycle has been completed, the first cycle fuels 1 are moved to positions from which the second cycle fuels 2 have been removed, the second cycle fuels 2 are moved to positions from which the third cycle fuels have been removed, the third cycle fuels 3 are moved to positions from which the fourth cycle fuels 4 have been removed and new reload fuels are disposed at positions from which the first cycle fuels 1 have been removed.

After the completion of the operation cycle, the 116 considerably fissioned fourth cycle fuels 4 among the fourth cycle fuels 4 and all the fifth cycle fuels 5 are removed from the reactor core, and the remaining 80 fourth cycle fuels 4 are moved to positions from which the fifth cycle fuels 5 have been removed.

An operation is continued for most of the period of an operation cycle with cruciform control rods, not shown, inserted in the first control cells (A) 11 and (B) 12 and without inserting any control rods in the second control cells 20; that is, the control rods are inserted in only the first control cells (A) 11 and (B) 12 for most of the period of the operation cycle and the nuclear reactor is operated.

Figure 3:
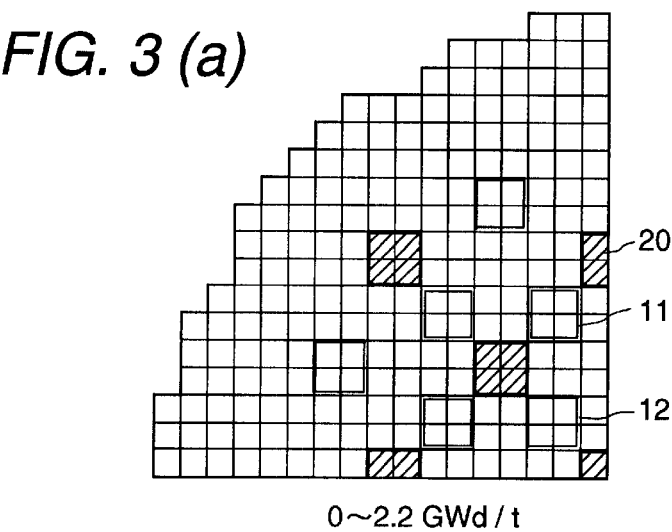
FIGS. 3(a) to 3(c) patterns in which control rods are arranged for an equilibrium cycle by the method in the first embodiment.
Figure 3:
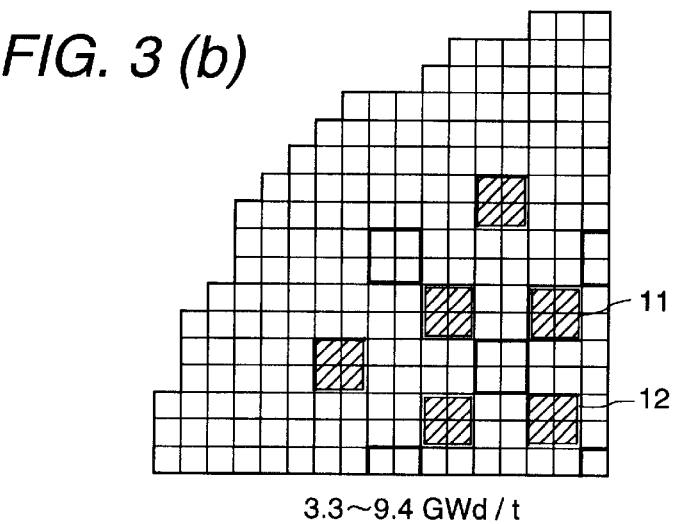
Figure 3:
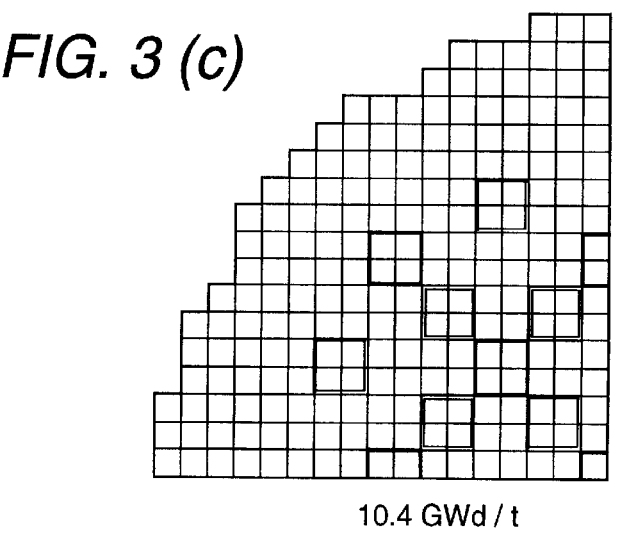

A control rod pattern, i.e., a pattern indicating the control rods inserted in the control cells, in the first embodiment will be described with reference to FIGS. 3(a), 3(b) and 3(c) are quarter sectional views of control rod patterns in which, which control rods are arranged by the method in the first embodiment. In FIGS. 3(a), 3(b) and 3(c), the control rods are inserted in the shaded control cells.

In an initial stage of the cycle, in which burn-up is in the range of 0 to 2.2 GWd/t, the nuclear reactor is operated with the control rods inserted in the thirteen second control cells 20 as shown in FIG. 3(a) In most of the remaining period of the cycle, in which burn-up is in the range of 3.3 to 9.4 GWd/t, the nuclear reactor is operated with the control rods inserted in only the twenty four first control cells (A) 11 and (B) 12 as shown in FIG. 3(b). In the last stage of operation of the nuclear reactor, in which burn-up is 10.4 GWd/t, all the control rods are extracted from the reactor core as shown in FIG. 3(c).

In most of the period of the cycle, the nuclear reactor is operated with the control rods inserted alternately in the first control cells (A) 11 and the first control cells (B) 12. First, the control rods are inserted in only the first control cells (A) 11 for a period in which the nuclear reactor operates at a burn-up of several gigawatts day per ton, and then the control rods are extracted from all the first control cells (A) 11 and control rods are inserted in only the first control cells (B) 12 for a period in which the nuclear reactor operates at several gigawatts day per ton. Thereafter, this operating mode is repeated.

Generally, asymmetric burn-up occurs in the fuels of the fuel assemblies when the control rod is inserted in the control cell. Therefore,when the control rod is extracted, then output increases locally in the fuel rods adjacent to the control rod, causing control blade historical effect which adversely affects the soundness of the fuel rods.

This embodiment limits burn-up in a period in which the control rods are inserted continuously in the first control cells (A) 11 and the first control cells (B) 12 to several gigawatts day per ton to reduce the control blade historical effect which occurs when the control rods are extracted.

A method in a comparative example for verifying the effect of the first embodiment operates the nuclear reactor through a cycle with the control rods inserted in only the second control cells 20 each consisting of the four fuel assemblies having relatively small infinite multiplication factors.

An equilibrium core for carrying out the comparative example comprises 872 reload fuel assemblies including 200 first cycle fuels 1, 200 second cycle fuels 2, 200 third cycle fuels 3, 200 fourth cycle fuels 4, and 72 fifth cycle fuels 5.

The mean enrichment factor of the reload fuels, the numbers and the arrangement of the first control cells (A) 11 and (B) 12, and the number and the arrangement of the second control cells 20 are the same as those in the reactor core for carrying out the first embodiment.

In this reactor core, the first cycle fuels 1, the second cycle fuels 2 and the third cycle fuels 3 are disposed in regions other than an outer peripheral region of the reactor core and regions for the second control cells 20. The fifth cycle fuels 5 are disposed in the outer peripheral region and in the regions for the second control cells 20. The fourth cycle fuels 4 are disposed in the outer peripheral region of the reactor core, the regions for the second control cells 20, regions providing relatively high output and outer regions of the reactor core.

After an operation cycle has been completed, the first cycle fuels 1 are moved to positions from which the second cycle fuels 2 have been removed, the second cycle fuels 2 are moved to positions from which the third cycle fuels have been removed, and the third cycle fuels are moved to positions from which the fourth cycle fuels 4 have been removed. New reload fuels are disposed at positions from which the first cycle fuels have been removed.

After the operation cycle has been completed, 128 considerably fissioned fourth cycle fuels 4 having a relatively small infinite multiplication factor among the fourth cycle fuels 4 are removed from the reactor core, and the remaining 72 fourth cycle fuels 4 are moved to positions from which the fifth cycle fuels 5 have been removed. All the fifth cycle fuels 5 are removed from the reactor core.

In this comparative example, the control rods are inserted in the second control cells 20 throughout the cycle of operation of the nuclear reactor (FIGS. 3(a) and 3(b)), and all the control rods are extracted from the reactor core in the last stage of the cycle (FIG. 3(c)).

When the nuclear reactor is operated by the method in the first embodiment, the number of new reload fuels to be loaded into the reactor core after the completion of the cycle is smaller by four than that of the new reload fuels to be loaded into the reactor core after the completion of the cycle when the nuclear reactor is operated by the method in the comparative example.

Such an effect can be provided by operating the nuclear reactor with the control rods inserted in the first control cells for a period (FIG. 3(b)) longer than half of the period of the cycle (FIGS. 3(a) to 3(c)); that is, the effect can be provided even if the control rods are inserted in the first control cells throughout the cycle (FIGS. 3(a) and 3(b)).

A fuel arrangement including both the initial loading fuels and the reload fuels for the third cycle will be explained by way of example.

Figure 4:
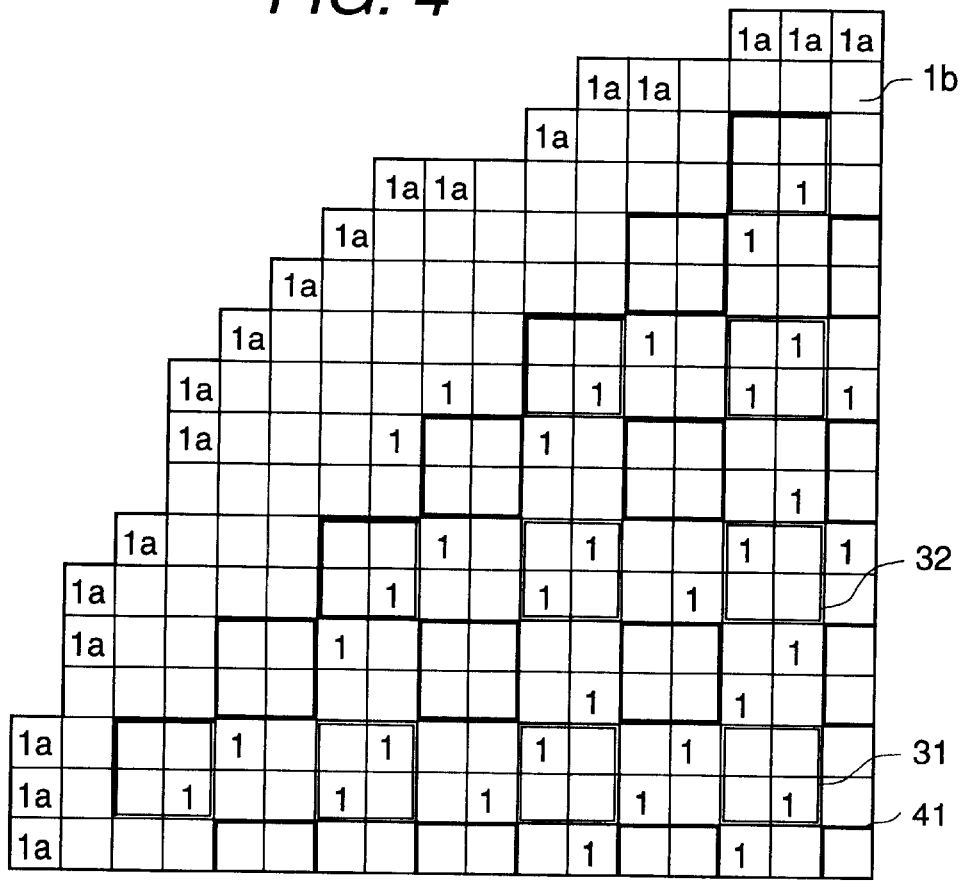
FIG. 4 is a quarter sectional view of a fuel loading pattern for a third cycle formed by a method representing a second embodiment according to the present invention.
Figure 4:
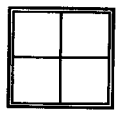
Figure 4:
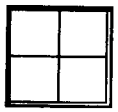
Figure 4:
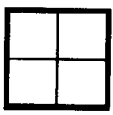
Figure 4:
Figure 4:
Figure 4:

FIG. 4 is a quarter sectional view of a fuel loading pattern for the third cycle formed by a method representing a second embodiment according to the present invention. The reactor core of a nuclear reactor is provided with 208 low enrichment fuel assemblies (hereinafter referred to as "low-enrichment fuels") having a mean enrichment factor of about 1.5 wt % at initial loading and 664 high-enrichment fuel assemblies (hereinafter referrer to as "high enrichment fuels") having a mean enrichment factor of about 4.1 wt % at initial loading, and no reload fuels are loaded into the reactor core in the second cycle.

The reactor core in the third cycle as shown in FIG. 4 comprises 872 fuel assemblies including 132 first cycle fuels 1, 76 low-enrichment fuels 1a (initial loading fuels) and 664 high-enrichment fuels 1b (initial loading fuels). The first cycle fuels 1, i.e., reload fuels, are fuel assemblies having a mean enrichment factor of about 3.8 wt %.

Forty first control cells each comprising the first cycle fuels 1 and the fissioned high-enrichment fuels having relatively large infinite multiplication factors, and thirty-seven second control cells 40 each comprising considerably fissioned high-enrichment fuels having relatively small infinite multiplication factors are formed in the reactor core.

The first control cells are divided into two groups differing from each other in the operation of the control rods; sixteen first control cells (A) 31 and twenty-four first control cells (B) 32.

The first cycle fuels 1 are disposed in a central region of the reactor core, the low-enrichment fuels 1a are arranged in an outer peripheral region of the reactor core, and the high-enrichment fuels 1b are disposed in the rest remaining regions in the reactor core.

After the completion of this operation cycle, i.e., the third cycle, the 216 fuels including all the 76 low enrichment fuels 1a, and the 140 considerably fissioned high-enrichment fuels 1b having small infinite multiplication factors among the high-enrichment fuels 1b are removed from the reactor core and 216 new reload fuels are loaded into the reactor core.

In most of the period of the third cycle, the nuclear reactor is operated with cruciform control rods, not shown, inserted in the first control cells (A) 31 and (B) 32, and without inserting any control rods in the second control cells 40. That is, the nuclear reactor is operated for the most part of the period of the third cycle with the control rods inserted in only the first control cells (A) 31 and (B) 32.

Figure 5:
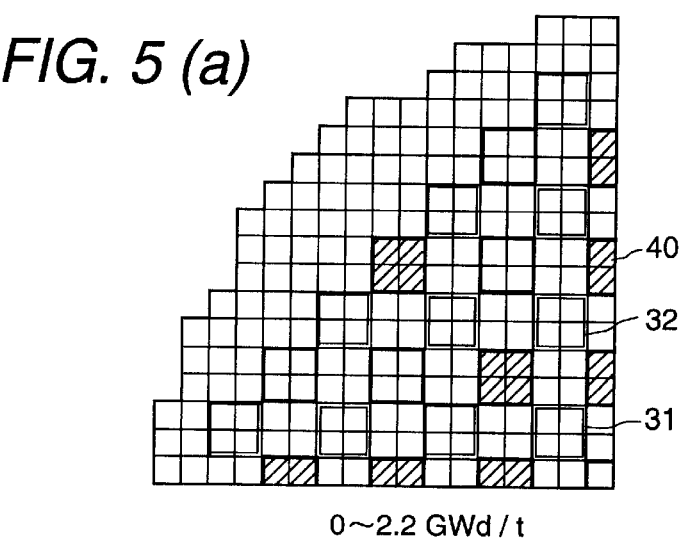
FIGS. 5(a) to 5(c) are diagrams of patterns in which control rods are arranged for the third cycle by the method in the second embodiment.
Figure 5:
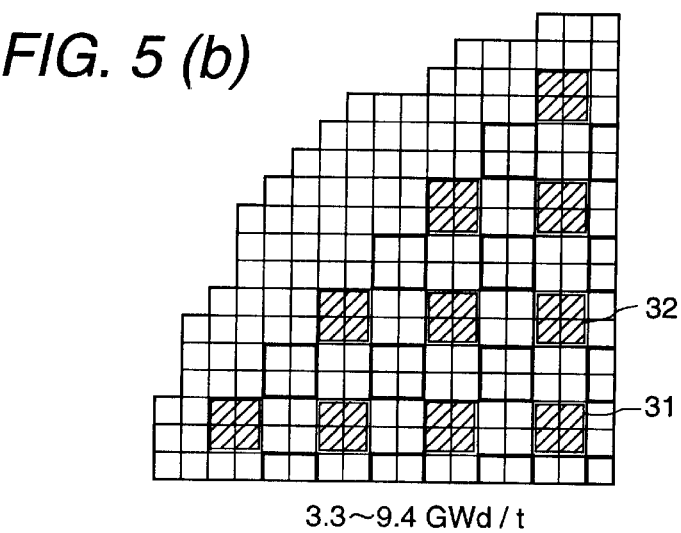
Figure 5:
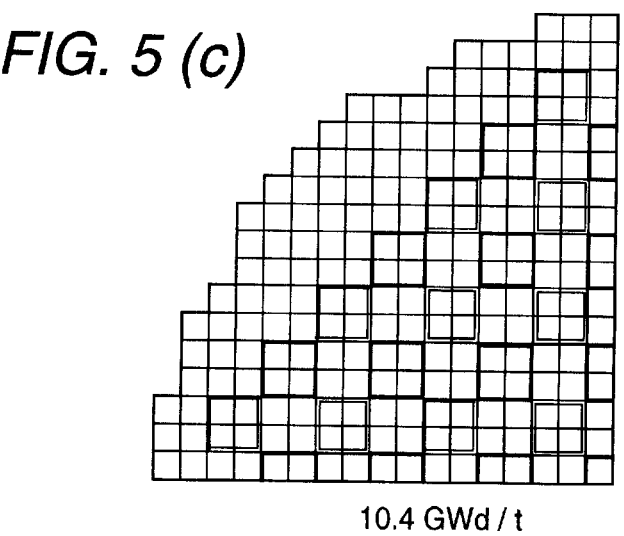

A control rod pattern in the second embodiment will be described with reference to FIGS. 5(a), 5(b) and 5(c), which are quarter sectional views of control rod patterns in which control rods are arranged by the method in the second embodiment. In FIGS. 5(a). 5(b) and 5(c), the control rods are inserted in the shaded control cells.

In an initial stage of the cycle, in which burn-up is in the range of 0 to 2.2 GWd/t, the nuclear reactor is operated with the control rods inserted in the twenty second control cells 40 as shown in FIG. 5(a). In most of the remaining period of the cycle, in which burn-up is in the range of 3.3 to 9.4 GWd/t, the nuclear reactor is operated with the control rods inserted in only the forty first control cells (A) 31 and (B) 32 as shown in FIG. 5(b). In the last stage of the cycle, in which burn-up is 10.4 GWd/t, all the control rods are extracted from the reactor core as shown in FIG. 5(c).

In most of the period of the cycle, the method in the second embodiment, similarly to the method in the first embodiment, operates the nuclear reactor by inserting the control rods alternately in the first control cells (A) 31 and the first control cells (B) 32 for a period in which burn-up is several gigawatts day per ton. Thus, the second embodiment, similarly to the first embodiment, reduces control blade historical effect that occurs when the control rods are extracted.

A method in a comparative example for verifying the effect of the second embodiment operates the nuclear reactor through a cycle with the control rods inserted in only the second control cells 40 each consisting of the four fuel assemblies having the same loading patterns and relatively small infinite multiplication factors. The mode of operation in the first and the second cycle and the movement of the fuel assemblies after the completion of the second cycle by the method in the comparative example is the same as those by the method in the second embodiment.

The method in the comparative example operates the nuclear reactor by inserting the control rods only in the second control cells 40 throughout the third cycle (FIGS. 5(a) and 5(b)), and extracts all the control rods from the reactor core in the last stage of the cycle (FIG. 5(c)).

The method in the comparative example removes 220 fuels including all the low-enrichment fuels 1a and 144 considerably fissioned high-enrichment fuels 1b having small infinite multiplication factors among the high enrichment fuels 1b after the completion of the third cycle and loads 220 new reload fuels into the reactor core.

Accordingly, when the nuclear reactor is operated by the method in the second embodiment, the number of the new reload fuels to be loaded into the reactor core after the completion of the cycle is smaller by four than that of the new reload fuels to be loaded into the reactor core after the completion of the cycle when the nuclear reactor is operated by the method in the comparative example.

Such an effect can be provided by operating the nuclear reactor with the control rods inserted in the first control cells for a period (FIG. 5(b)) longer than half of the period of the cycle (FIGS. 5(a) to 5(c)); that is, the effect can be provided even if the control rods are inserted in the first control cells throughout the cycle (FIGS. 5(a) and 5(b)).

The difference in the number of the reload fuels between the first embodiment and the second embodiment, and the comparative examples, and the criticality of the nuclear reactor will be explained below.

As mentioned above, the burn-up of the fuel assemblies forming the control cells into which the control rods are inserted is suppressed by the control action of the control rods.

The method in the foregoing embodiment operates the nuclear reactor with the control rods inserted in the control cells each comprising the large-infinite-multiplication-factor fuels for most of the period of one operation cycle. Accordingly, the fuel assemblies of the first control cells still have enough infinite multiplication factors after the completion of the operation cycle.

Since the fuel assemblies having large infinite multiplication factors can be used in the next cycle, the nuclear reactor can be kept in a critical state in the next cycle even if the number of the new reload fuels is smaller than that of the new reload fuels needed by the method in the comparative example.

In the foregoing embodiment, most or all of the fuel assemblies taken out of the reactor core after the completion of the cycle are those disposed in regions other than those in which the control cells are disposed. Accordingly, the burn-up of the fuel assemblies to be taken out of the nuclear reactor is promoted and the burn-up can be enhanced.

What is claimed is:

1. A method of operating a nuclear reactor having a reactor core in which a plurality of reload fuel assemblies respectively having different infinite multiplication factors are arranged, said reload fuel assemblies including small-number cycle reload fuel assemblies having a larger infinite multiplication factor than a large-number operation cycle reload fuel assemblies having a smaller infinite multiplication factor than the larger infinite multiplication factor of said small-number cycle reload fuel assemblies, the small-number cycle reload fuel assemblies having been operated for a smaller number of operation cycles than the number of cycles of operation of said large-number cycle reload fuel assemblies, said method comprising:

inserting control rods alternately in control cells of a first group and of a second group with respect to time, each control cell of the first group and the second group comprising four small-number cycle reload fuel assemblies having the larger infinite multiplication factor for a period longer than half of a period of an operation cycle.

2. A method of operating a nuclear reactor having a reactor core in which a plurality of reload fuel assemblies respectively having different infinite multiplication factors and a plurality of initial loading fuel assemblies comprising high-enrichment initial loading fuel assemblies and low-enrichment initial loading fuel assemblies with a lower enrichment factor than an enrichment factor of the high-enrichment initial loading fuel assemblies are arranged, said method comprising:

inserting control rods alternately in control cells of a first group and of a second group with respect to time, each control cell of the first group and the second group comprising four fuel assemblies including at least one reload fuel assembly and a plurality of high-enrichment initial loading fuel assemblies for a period longer than half of a period of an operation cycle.

3. The method of operating a nuclear reactor according to claim 1 or 2, wherein the control cells in which the control rods are inserted include new fuel assemblies loaded into the reactor core for the operation cycle.

4. The method of operating a nuclear reactor according to claim 1 or 2, wherein the control rods are inserted in the control cells of each group at time intervals corresponding to a burn-up of several gigawatts day per ton.

5. The method of operating a nuclear reactor according to claim 4, wherein the fuel assemblies other than those forming the control cells in which the control rods are inserted are removed from the reactor core after the completion of the operation cycle.

6. The method of operating a nuclear reactor according to claim 4, wherein most of the fuel assemblies arranged in an outer peripheral region of the reactor core are those having small infinite multiplication factors.

7. The method of operating a nuclear reactor according to claim 1, wherein the fuel assemblies other than those forming the control cells in which the control rods are inserted are removed from the reactor core after the completion of the operation cycle.

8. The method of operating a nuclear rector according to claim 2, wherein the fuel assemblies other than those forming the control cells in which the control rods are inserted are removed from the reactor core after the completion of the operation cycle.

9. The method of operating a nuclear reactor according to claim 3, wherein the fuel assemblies other than those forming the control cells in which the control rods are inserted are removed from the reactor core after the completion of the operation cycle.

10. The method of operating a nuclear reactor according to claim 1, wherein most of the fuel assemblies arranged in an outer peripheral region of the reactor core are those having small infinite multiplication factors.

11. The method of operating a nuclear reactor according to claim 2, wherein most of the fuel assemblies arranged in an outer peripheral region of the reactor core are those having small infinite multiplication factors.

12. The method of operating a nuclear reactor according to claim 3, wherein most of the fuel assemblies arranged in an outer peripheral region of the reactor core are those having small infinite multiplication factors.

13. A method of operating a nuclear reactor having a reactor core in which a plurality of reload fuel assemblies comprising small-number cycle reload fuel assemblies and large-number cycle reload fuel assemblies having been operated for a larger number of operation cycles than a number of operation cycles of the small-number cycle reload fuel assemblies are arranged, said method comprising:

inserting control rods alternately in control cells of a first group and of a second group with respect to time, each control cell of the first group and the second group comprising four reload fuel assemblies of the small-number cycle reload fuel assemblies for a period longer than half of a period of an operation cycle.

14. A method of operating a nuclear reactor having a reactor core in which a plurality of reload fuel assemblies and a plurality of initial loading fuel assemblies comprising high-enrichment initial loading fuel assemblies and low-enrichment initial loading fuel assemblies with a lower enrichment factor than an enrichment factor of the high-enrichment initial loading fuel assemblies are arranged, said method comprising:

inserting control rods alternately in control cells of a first group and those of a second group with respect to time, each control cell of the first group and the second group comprising four fuel assemblies formed of at least one of the reload fuel assemblies and a plurality of the high-enrichment initial loading fuel assemblies for a period longer than half of a period of an operation cycle.

15. The method of operating a nuclear reactor according to claim 1 or 13, wherein the number of operation cycles of the small-number cycle reload fuel assemblies is not greater than three and the number of operation cycles of the large-number cycle reload fuel assemblies is greater than three.

16. The method of operating a nuclear reactor according to claim 2 or 14, wherein each control cell of the first group and the second group comprise no more than two of the reload fuel assemblies.

* * * * *